UNITED STATES PATENT OFFICE.

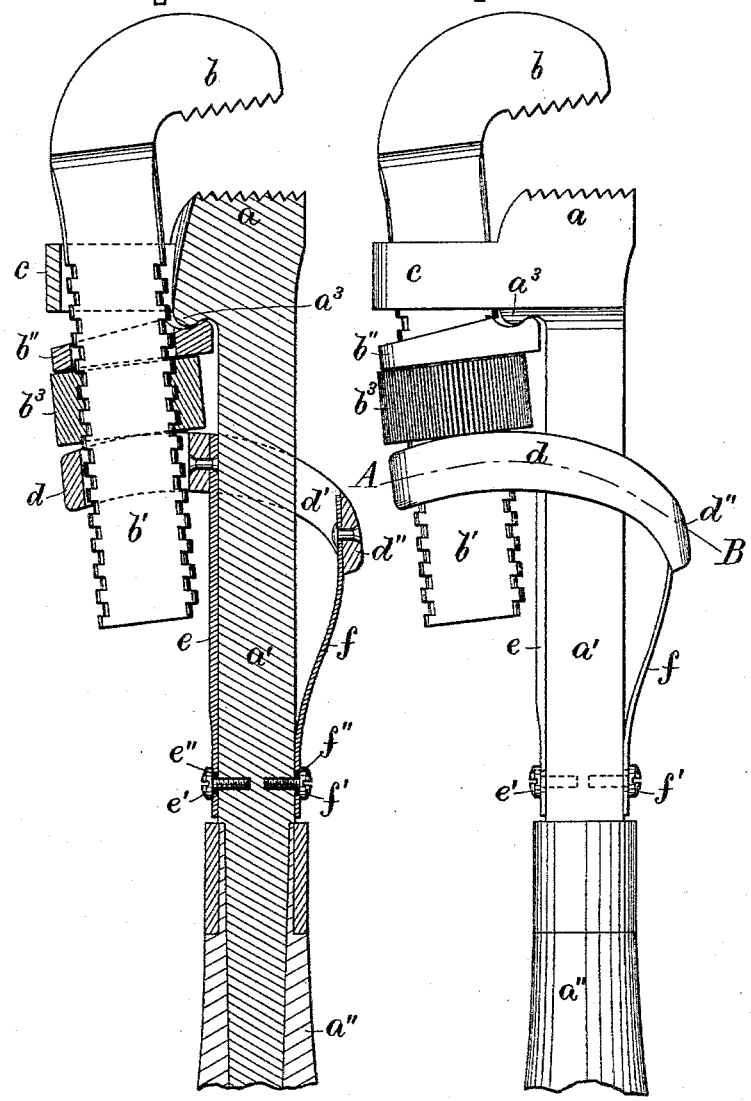

DAN P. FOSTER, OF WALTHAM, MASSACHUSETTS.

PIPE-WRENCH.

SPECIFICATION forming part of Letters Patent No. 339,634, dated April 13, 1886.

Application filed August 17, 1885. Serial No. 174,663. (No model.)

*To all whom it may concern:*

Be it known that I, DAN P. FOSTER, a citizen of the United States, residing at Waltham, in the county of Middlesex and State of Massachusetts, have invented certain new and useful Improvements in Nut and Pipe Wrenches; and I do declare that the same are fully described in the following specification and illustrated in the accompanying drawings.

This invention relates to improvements in nut and pipe wrenches, and it is carried out as follows, reference being had to the accompanying drawings, where—

Figure 1 represents a side elevation, and Fig. 2 represents a longitudinal section, of the improved wrench. Fig. 3 represents a cross-section on the line A B, shown in Fig. 1.

Similar letters refer to similar parts wherever they occur on the different parts of the drawings.

In the drawings, $a$ is the stationary jaw, with its shank $a'$ and handle $a''$, and $b$ is the movable jaw with its screw-threaded shank $b'$, as usual. Both of said jaws may be made plain or serrated, according to the use for which the wrench is intended.

To the rear of the stationary jaw $a$ is rigidly secured, or made in one piece with it, the slotted guide $c$ for the shank $b'$ of the movable jaw $b$, as shown in Figs. 1 and 2. The rear of the stationary jaw $a$ has a downwardly-projecting fulcrum edge or projection, $a^3$, against which the correspondingly-grooved washer $b''$ is brought to bear as the screw-threaded shank $b'$ is moved upward by means of the serrated thumb-nut $b^3$, which latter surrounds the shank $b'$ in the same manner as shown and described in the United States Letters Patent granted to me July 31, 1883, No. 282,298.

For the purpose of guiding the lower end of the screw-threaded shank $b'$, I employ a laterally-adjustable guide, $d$, through which the shank $b'$ passes loosely, as shown in Figs. 2 and 3. Said guide $d$ has a slotted perforation, $d'$, through which passes the stationary shank $a'$, as shown. The guide $d$ terminates in front of the shank $a'$ as a downwardly-projecting thumb-piece, $d''$. (Shown in Figs. 1 and 2.) The serrated nut $b^3$ is confined between the under side of the washer $b''$ and upper side of the guide $d$, as shown.

To prevent the guide $d$ from dropping downward on the stationary shank $a'$, I secure to it in a suitable manner the upper end of an elastic metallic bar, $e$, the lower end of which is secured by means of a set-screw, $e'$, to the rear of shank $a'$, as shown in Figs. 1 and 2, and for the purpose of properly regulating the position of the guide $d$ relative to nut $b^3$ when putting the wrench parts together, or for adjusting such parts when worn, I provide the lower end of the elastic bar $e$ with a slot-hole, $e''$, through which the set-screw $e'$ passes, and by this arrangement the vertical adjustment of the guide $d$ on the shank $a'$ is easily accomplished, for the purpose set forth. The elastic bar $e$ is so secured relative to the shank $a'$ and guide $d$ that it will have a tendency to force the lower end of the movable shank $b'$ toward the rear of the shank $a'$ when the wrench is not in use, as shown in Figs. 1 and 2. For the same purpose I secure to the thumb-piece $d''$ of the guide $d$ a similar elastic bar, $f$, the lower end of which is adjustably secured to the stationary shank $a'$ by means of set-screw $f'$, passing through a slot-hole, $f''$, in the lower end of the elastic bar $f$, as shown in Figs. 1 and 2. If so desired, I may dispense with this second elastic bar, $f$, for connecting the guide $d$ to the lower end of the shank $a'$. The upper surface of the laterally-movable guide $d$ is preferably made curved or arched, as shown in Fig. 1, to cause the nut $b^3$ to be held with proper play between the under side of washer $b''$ and top of said guide $d$ when the wrench is not in use; but I do not wish to confine myself to any particular shape of said guide $d$, as this may be varied without departing from the essence of my invention.

In using my improved wrench the movable jaw $b$ is first adjusted by means of turning the nut $b^3$ so that the object to be grasped can be introduced between the jaws $a$ and $b$, after which the operator presses the thumb-piece $d''$ toward the front of shank $a'$, against the influence of the elastic bar $e$, (or the secondary one $f$,) and thereby causes the jaw $b$ to swing on fulcrum $a^3$ until it is brought in contact with the object that is to be turned, after which the operator moves handle $a''$ in the direction shown by arrow in Fig. 1, thereby producing a firm grip on the object held between the jaws $a$ and $b$. By turning the handle $a''$ in an opposite direction the grip on the object held between the jaws $a\ b$ will instantly be relieved, and the elastic bar $e$ will cause the guide $d$ and movable jaw $b$ to be returned to their normal positions. (Shown in Figs. 1 and 2.)

What I wish to secure by Letters Patent and claim is—

1. The herein-described nut or pipe wrench, consisting of stationary jaw and shank $a\ a'$, having the fulcrum $a^3$ and stationary guide $c$, and movable jaw and shank $b\ b'$, having washer $b''$ and nut $b^3$, in combination with the lower movable guide, $d$, having one or two elastic bars secured to it and to the shank $a'$, as and for the purpose set forth.

2. In a nut or pipe wrench, the stationary shank $a'$, having stationary upper guide, $c$, and movable lower guide, $d$, provided with one or more elastic bars secured to it and to the shank $a'$, substantially in a manner and for the purpose set forth.

3. In a nut or pipe wrench, the stationary shank $a'$, having stationary upper guide, $c$, and movable lower guide, $d$, provided with one or more elastic connecting-bars secured to the said guide $d$ and shank $a'$, and made vertically adjustable on the latter, as and for the purpose set forth.

In testimony whereof I have affixed my signature in presence of two witnesses.

DAN P. FOSTER.

Witnesses:
ALBAN ANDRÉN,
HENRY CHADBOURN.